United States Patent [19]

Jäger et al.

[11] 4,118,382
[45] Oct. 3, 1978

[54] REACTIVE MONO-AZO DYESTUFFS HAVING A 4-AMINO-3,5(OR-6)-DISULFOACETIC ACID COUPLING COMPONENT AND A REACTIVE GROUP ATTACHED TO THE DIAZO COMPONENT

[75] Inventors: Horst Jäger, Leverkusen; Georg Dehmel, Cologne, both of Germany

[73] Assignee: Bayer Aktiengesellschaft, Leverkusen, Germany

[21] Appl. No.: 800,573

[22] Filed: May 25, 1977

Related U.S. Application Data

[63] Continuation of Ser. No. 235,856, Mar. 17, 1972, abandoned.

[30] Foreign Application Priority Data

Mar. 19, 1971 [DE] Fed. Rep. of Germany ...... 2113298

[51] Int. Cl.$^2$ ............... C09B 29/36; C09B 62/08; C09B 62/24; C09B 62/40
[52] U.S. Cl. ................... 260/154; 260/153; 260/156; 260/157; 260/158; 260/193; 260/509 R
[58] Field of Search ............. 260/153, 146 T, 154, 260/149 D

[56] References Cited

U.S. PATENT DOCUMENTS

| 2,931,794 | 4/1960 | Ruetimeyer et al. | 260/146 T |
|---|---|---|---|
| 3,086,967 | 4/1963 | Davies et al. | 260/193 X |
| 3,197,456 | 7/1965 | Kuhne et al. | 260/163 |
| 3,208,992 | 9/1965 | Bowman et al. | 260/162 |
| 3,256,054 | 6/1966 | Cole et al. | 260/154 X |
| 3,261,823 | 7/1966 | Kuhne et al. | 260/149 |
| 3,278,516 | 10/1966 | Scherer et al. | 260/163 |
| 3,278,549 | 10/1966 | Scherer et al. | 260/193 X |
| 3,346,553 | 10/1967 | Kuhn et al. | 260/163 |
| 3,360,509 | 12/1967 | Scherer et al. | 260/163 |
| 3,419,541 | 12/1968 | Kuhne et al. | 260/162 |
| 3,519,616 | 7/1970 | Bauer et al. | 260/193 |
| 3,577,405 | 5/1971 | Hoffmann et al. | 260/193 |
| 3,666,747 | 5/1972 | Siegel et al. | 260/154 |
| 3,669,951 | 6/1972 | Bien et al. | 260/146 D |
| 3,692,463 | 9/1972 | Back et al. | 260/193 X |

OTHER PUBLICATIONS

Venkataraman, "The Chemistry of Synthetic Dyes," vol. 1, pp. 457 to 463 (1952).

*Primary Examiner*—Floyd D. Higel
*Attorney, Agent, or Firm*—Plumley and Tyner

[57] ABSTRACT

Reactive dyestuffs of the formula

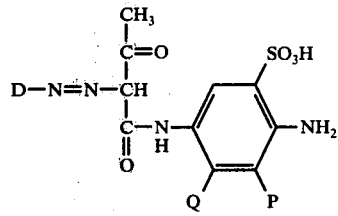

in which
Q and P are hydrogen or sulfonic acid but cannot simultaneously have the same meaning; and
D is a radical of an aromatic-carbocyclic or aromatic-heterocyclic diazo component which contains a reactive group, are disclosed. These are useful for the dyeing and printing of materials containing hydroxyl groups or amide groups, such as textile fibres, filaments and fabrics of wool, silk and synthetic polyamide and polyurethane fibres, and for the wash-fast dyeing and printing of natural or regenerated cellulose, the treatment of cellulose materials being appropriately carried out in the presence of acid-binding agents and if appropriate by the action of heat, in accordance with the known processes for reactive dyestuffs.

3 Claims, No Drawings

REACTIVE MONO-AZO DYESTUFFS HAVING A 4-AMINO-3,5(OR-6)-DISULFOACETIC ACID COUPLING COMPONENT AND A REACTIVE GROUP ATTACHED TO THE DIAZO COMPONENT

This is a continuation, of application, Ser. No. 235,856, filed Mar. 17, 1972, now abandoned.

The subject of the present invention are new reactive dyestuffs of the general formula

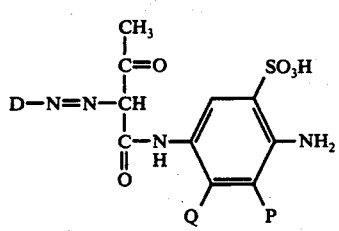

wherein
Q and P denote hydrogen or a sulphonic acid group, but cannot simultaneously have the same meaning and
D represents a radical of an aromatic-carbocyclic or aromatic-heterocyclic diazo component which contains reactive groups, especially the radical of a diazo component, containing reactive groups, of the benzene series or benzthiazole series.

By reactive groups there are here understood those which react either directly by addition or by replacement of a substituent which can be split off, preferably as an anion, by amino, amide or hydroxyl groups of natural or synthetic fibre materials under dyeing or printing conditions, preferably in the presence of acid-binding compounds, especially compounds which react alkaline, to form a covalent bond. The reactive groups can be linked directly or via a bridge member to a carbon atom of an aromatic-carbocyclic or aromatic-heterocyclic ring in the radical D, or can represent the residual constituent of an azo dyestuff, preferably the residue of the diazo component.

Preferred bridge members are the following: —N(-R)—, —SO$_2$N(R)—, —CON(R)—, —N(R)-alkylene-N(R)—,

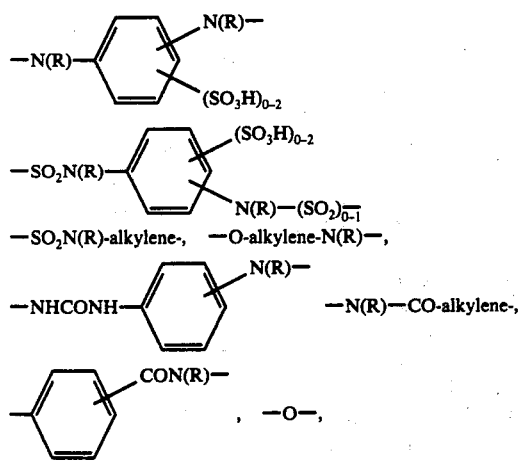

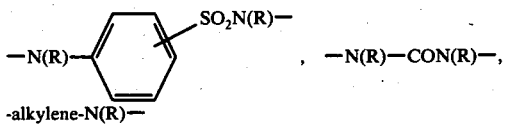

wherein
R denotes hydrogen or C$_1$-C$_4$-alkyl.

Particularly suitable reactive groups which contain at least one removable substituent bonded to an aromatic heterocyclic radical are, inter alia, those which contain at least one removable substituent bonded to a 5-membered or 6-membered aromatic-heterocyclic ring by being bonded to a C atom of a —C=N— bond, for example to a monoazine, diazine or triazine ring, such as to a pyridine, pyrimidine, pyridazine, pyrazine, thiazine, oxazine, sym.-triazine, quinoline, phthalazine, cinnoline, quinazoline or quinoxaline ring or to a thiazole, thiadiazole, isothiazole, benzthiazole or benzoxazole ring.

As examples from amongst the reactive substituents on the heterocyclic structure, there should be mentioned halogen (Cl, Br or F), ammonium, including hydrazinium, sulphonium, sulphonyl, azido (N$_3$), thiocyanato, thio, thioether, hydroxyether, sulphinic acid and sulphonic acid. Individual examples which should be mentioned are mono- or di-halogeno-sym.-triazinyl radicals, for example 2,4-dichloro-triazinyl-6, 2-amino-4-chlorotriazinyl-6, 2-alkylamino-4-chlorotriazinyl-6, such as 2-methylamino-4-chlorotriazinyl-6, 2-ethylamino- or 2-propyl-amino-4-chlorotriazinyl-6, 2-β-hydroxyethylamino-4-chlorotriazinyl-6, 2-di-β-hydroxyethylamino-4-chlorotriazinyl-6 and the corresponding sulphuric acid half-esters, 2-diethylamino-4-chlorotriazinyl-6, 2-morpholino- or 2-piperidino-4-chlorotriazinyl-6, 2-cyclohexyl-amino-4-chlorotriazinyl-6, 2-arylamino- and substituted arylamino-4-chlorotriazinyl-6, such as 2-phenylamino-4-chlorotriazinyl-6, 2-(o-, m- or p-carboxy- or sulphophenyl)-amino-4-chlorotriazinyl-6, 2-alkoxy-4-chlorotriazinyl-6, such as 2-methoxy- or ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p-methyl- or methoxy-phenyl)-oxy-4-chlorotriazinyl-6, 2-alkyl-mercapto- or 2-aryl-mercapto- or 2-(substituted aryl)-mercapto-4-chlorotriazinyl-6, such as 2-(β-hydroxyethyl)-mercapto-4-chloro-triazinyl-6, 2-phenylmercapto-4-chlorotriazinyl-6, 2-(4'-methyl-phenyl)-mercapto-4-chlorotriazinyl-6, 2-(2',4'-dinitrophenyl)-mercapto-4-chlorotriazinyl-6, 2-methyl-4-chloro-triazinyl-6 and 2-phenyl-4-chlorotriazinyl-6, mono-, di- or trihalogenopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl- or -5-sulpho- or -5-mono, -di- or -trichloromethyl- or -5-carboalkoxy-pyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4- dichlorophthalazine-6-sulphonyl or -6-carbonyl, 2- or 3- or 4-(4', 5'-dichloropyridazon-6'-yl-1')-phenylsulphonyl- or -carbonyl, μ-(4',5'-dichloropyridazon-6'-yl-1')-ethylcarbonyl, N-methyl-N-(2,4-dichlorotriazinyl-6)-carbamyl, N-methyl-N-(2-methylamino-4-chlorotriazinyl-6)-carbamyl, N-methyl-N-(2-dimethyl-amino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)-aminoacetyl and N-methyl-N-(2,3-dichloroquinoxaline-6-carbonyl)-aminoacetyl as well as the corresponding bromine and fluorine derivatives of the abovementioned chlorine-substituted heterocyclic radicals including, for example, 2-fluoro-4-pyrimidinyl, 2,6-difluoro-4-pyrimidinyl, 2,6-difluoro-5-chloro-4-pyrimidinyl. 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4pyrimidinyl, 2,5,6-trifluoro-4-pyrimidinyl, 5-chloro-6-chloromethyl-2-(fluoro-4-pyrimidinyl, 2,6-difluoro-5-bromo-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4pyrimidinyl, 2-fluoro-5-nitro-4-pyrimidinyl-2-fluoro-5-trifluoromethyl-4-pyrimidinyl, 2-fluoro-5-phenyl- or -5-methylsulphonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazinyl-6, 2-(3'-carboxyphenyl)-sulphonyl-4-chlorotriazinyl-6, 2-(3'-sulphophenyl)-sulphonyl-4-chlorotriazinyl-6 and 2,4-bis-(3'-carboxy-phenylsulphonyl-1')-triazinyl-6; pyrimidine rings containing sulphonyl groups, such as 2-carboxymethylsulphonyl-pyrimidinyl-4, 2-methylsulphonyl-6-methyl-pyrimidinyl-4, 2-methylsulphonyl-6-ethyl-pyrimidinyl-4, 2-phenylsulphonyl-5-chloro-6-methyl-pyrimidinyl-4, 2,6-bis-methylsulphonyl-pyrimidinyl-4, 2,6-bis-methylsulphonyl-5-chloro-pyrimidinyl-4, 2,4-bis-methylsulphonyl-pyrimidine-5-sulphonyl, 2-methylsulphonyl-pyrimidinyl-4, 2-phenylsulphonyl-pyrimidinyl-4, 2-trichloromethylsulphonyl-6-methylpyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethyl-pyrimidinyl-4, 2-methylsulphonyl-5-chloro-6-chloromethyl-pyrimidinyl-4, 2-methylsulphonyl-4-chloro-6-methylpyrimidine-5-sulphonyl, 2-methylsulphonyl-5-nitro-6-methyl-pyrimidinyl-4, 2,5,6-tris-methylsulphonyl-primidinyl-4, 2-methylsulphonyl-5,6-dimethylpyrimidinyl-4, 2-ethylsulphonyl-5-chloro-6-methyl-pyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-chloro-pyrimidinyl-4, 2-sulphoethylsulphonyl-6-methyl-pyrimidinyl-4, 2-methylsulphonyl-5-bromo-pyrimidinyl-4, 2-phenylsulphonyl-5-chloropyrimidinyl-4, 2-carboxymethylsulphonyl-5-chloro-6-methyl-pyrimidinyl-4, 2-methylsulphonyl-6-chloropyrimidine-4- and -5-carbonyl, 2,6-bis-(methylsulphonyl)-pyrimidine-4 -or -5-carbonyl, 2-ethyl-sulphonyl-6-chloropyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl; triazine rings containing ammonium groups, such as 2-trimethylammonium-4-phenylamino- or -4-(o-, m- or p-sulphophenyl)-amino-triazinyl-6, 2-(1,1-dimethyl-hydrazinium)-4-phenylamino- or -4-(o-, m- or p-sulphophenyl)-aminotriazinyl-6, 2-(2-isopropylidene-1, 1-dimethyl)-hydrazinium-4-phenylamino- or -4-(o-, m- or p-sulphophenyl)-aminotriazinyl-6, 2-N-aminopyrrolidinium- or 2-N-amino-piperidinium-4-phenylamino- or -4-(o-, m- or p-sulphophenyl)-aminotriazinyl-6, and also 4-phenylamino- or 4-(sulphophenylamino)-triazinyl-6 radicals which in the 2-position contain 1,4-bis-aza-bicyclo[2,2,2]-octane or 1,2-bis-aza-bicyclo[0,3,3]-octane bonded as a quaternary structure via a nitrogen bond, 2-pyridinium-4-phenylamino- or -4-(o-, m- or p-sulphophenyl)-amino-triazinyl-6 as well as corresponding 2-oniumtriazinyl-6 radicals which are substituted in the 4-position by alkylamino, such as methylamino, ethylamino or β-hydroxyethylamino, or alkoxy, such as methoxy or ethoxy, or aroxy, such as phenoxy or sulphophenoxy, groups; 2-chlorobenzthiazole-5- or -6-carbonyl or -5- or -6-sulphonyl, 2-arylsulphonyl- or -alkylsulphonyl-benzthiazole-5- or -6-carbonyl or -5- or -6-sulphonyl, such as 2-methylsulphonyl- or 2-ethylsulphonylbenzthiazole-5- or -6-sulphonyl or -carbonyl, 2-phenylsulphonyl-benzthiazole-5- or -6-sulphonyl or -carbonyl and the corresponding 2-sulphonylbenzthiazole-5-or -6-carbonyl or -sulphonyl derivatives which contain sulpho groups in the fused benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl and the N-oxide of 4-chloro- or 4-nitro-quinoline-5-carbonyl.

Additionally, reactive groups of the aliphatic series should be mentioned, such as acryloyl, mono-, di- or tri-chloroacryloyl, such as -CO-CH=CH-Cl, -CO-CCl=CH$_2$ and -CO-CCl=CH-CH$_3$, and also -CO-CCl=CH-COOH, -CO-CH=CCl-COOH, β-chloropropionyl, 3-phenylsulphonylpropionyl, β-sulphatoethylaminosulphonyl, vinylsulphonyl, β-chloroethylsulphonyl, β-sulphatoethylaminosulphonyl, β-methylsulphonyl-ethylsulphonyl, β-phenylsulphony ethylsulphonyl, 2-fluoro-2-chloro-3,3-difluorocyclobutane-1-carbonyl, 2,2,3,3-tetrafluorocyclobutanecarbonyl-1 -or -sulphonyl-1, β-(2,2,3,3-tetrafluorocyclobutyl-1)-acryloyl, α- or β-bromoacryloyl, α- or β-alkyl- or -aryl-sulphonyl-acryloyl groups, such as α- or β-methylsulphonyl-acryloyl, chloroacetylamino, β-chloropropionylamino, α,β-dichloropropionylamino, α,β-dibromopropionylamino, β-sulphato-propionylamino and β-sulphonylpropionylamino groups.

Preferred compounds within the framework of the new dyestuffs correspond to the formulae:

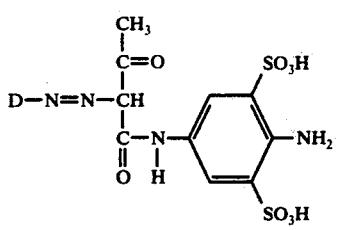 (II)

wherein
D has the indicated meaning,

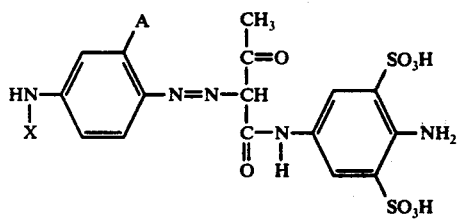 (III)

wherein
A represents a carboxylic acid or sulphonic acid group and
X represents a reactive group,
or

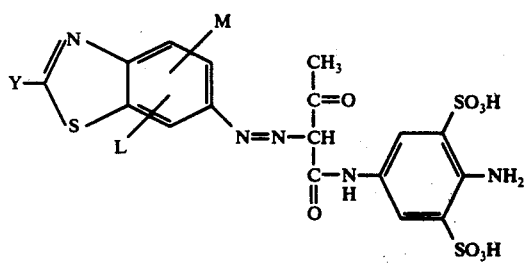 (IV)

wherein
Y represents a removable substituent and
M and L denote hydrogen or a substituent, especially hydrogen, chlorine, bromine, methyl, methoxy, ethoxy, sulphonic acid, carboxylic acid or acylamino groups.

As examples of removable radicals Y there may be mentioned halogen atoms (chlorine, bromine or fluorine), ammonium, including hydrazine, sulphonium, sulphonyl, azido($N_3$), thiocyanato, thio, thioether, hydroxyether, sulphinic acid and sulphonic acid. Additional preferred dyestuffs are those of the formula

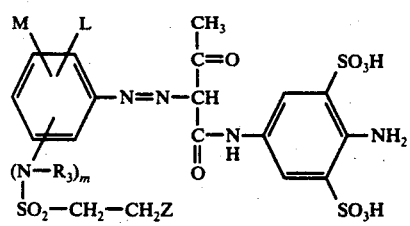 (V)

wherein
M and L have the indicated meaning,
Z represents $-OSO_3H$, $-SSO_3H$, $-OPO_3H_2$, or

wherein
$R_1$ and $R_2$ denote a lower alkyl radical,
$R_3$ represents a hydrogen atom or a lower alkyl radical and
m represents 0 or 1.

The new dyestuffs are obtained if the diazo compound of an amine of the formula $D-NH_2$,
wherein
D has the abovementioned meaning,
is combined with at least 1 mol of a coupling component of the formula

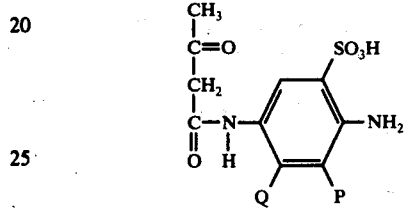 (VI)

wherein
Q and P have the indicated meaning.

The coupling takes place in a weakly acid, neutral or weakly alkaline medium.

The compounds according to the invention can also be manufactured if a reactive group is introduced in accordance with methods which are in themselves customary, for example by condensation, or acylation, into the radical $D_1$ in a dyestuff of the formula

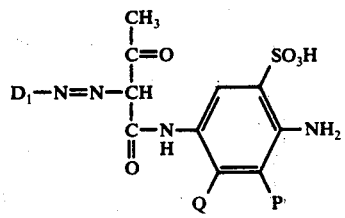 (VII)

wherein
$D_1$ represents the radical of a diazo component which is free of reactive groups and
Q and P have the abovementioned meaning.

For this, the procedure which can be followed is that in a dyestuff of the formula

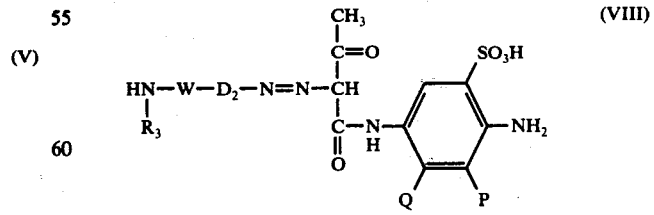 (VIII)

in which
$R_3$, Q and P have the abovementioned meaning,
W represents a bridge member or a direct bond and
$D_2$ represents a divalent aromatic-carbocyclic or aromatic-heterocyclic radical, especially an optionally substituted phenylene or naphthylene radical, the grouping

is converted by condensation with an at least bifunctional reactive component = X-Y′, wherein
X represents the radical of a reactive component and Y′ denotes a group which can be removed as an anion, into a radical

wherein
R₃ has the abovementioned meaning and
X represents the radical of a reactive component.

Examples of possible bridge members W are the radicals —CH₂—, —SO₂—, —CH₂CO-NH—, —CH₂-CH₂-NH-SO₂—, —CH₂-CH₂-N(CH₃)-SO₂—, —CH₂-CH₂-NH-CO—, and —CH₂-CH₂-N(CH₃)CO—. Preferably, W is a direct bond or —CH₂—.

As examples of radicals D₂ there may be mentioned: phenylene-(1,3) or -(1,4), 2-sulpho-phenylene-(1,5) or -(1,4), 2-carboxy-phenylene-(1,4) or -(1,5), 6-methoxy-4-sulphophenylene-(1,3), 5-methoxy-2-sulpho-phenylene-(1,4), 2-methyl-5-sulphophenylene-(1,3), 2-chloro-phenylene-(1,4), 6-sulpho-naphthylene-(1,4), 4,8-disulpho-naphthylene-(2,6) or -(2,5), 2,2′-disulpho-stilben-ylene-(4,4′), 2,5-disulphophenylene-(1,4) or the radical:

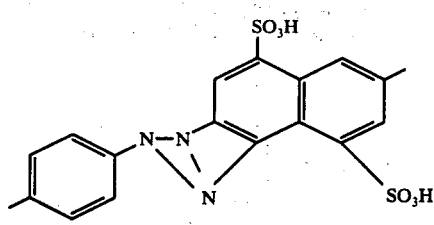

Suitable acetoacetic acid arylides are, for example, acetoacetic acid 4-amino-3,5-disulphoanilide and acetoacetic acid 4-amino-2,5-disulphoanilide.

Examples of possible amines DNH₂ are compounds of the type of the formulae IX-XXV.

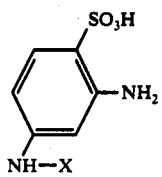

IX

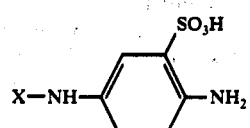

X

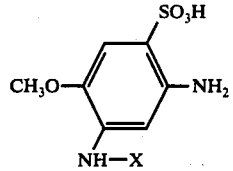

XI

XII

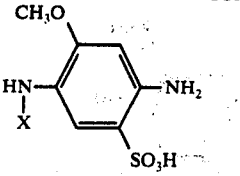

XIII

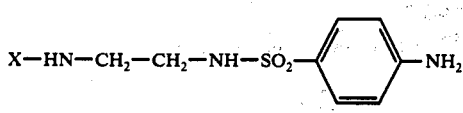

XIV

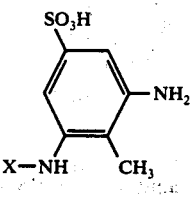

XV

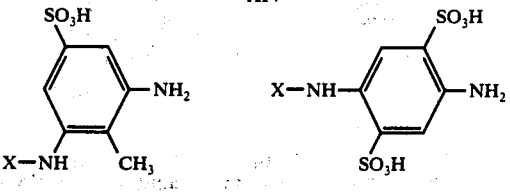

XVI

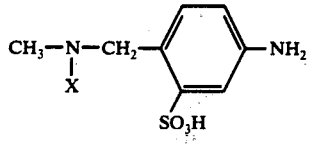

XVII

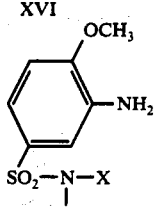

XVIII

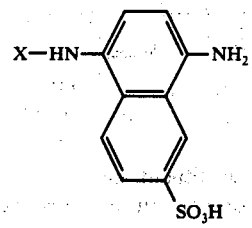

XIX

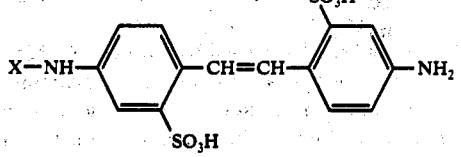

XX

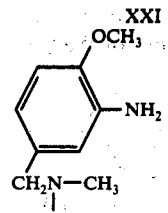

XXII

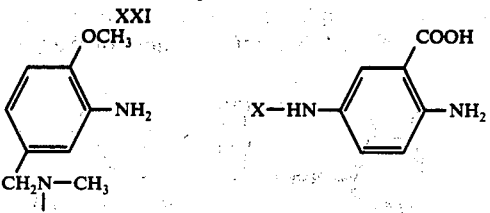

XXI / XXIII

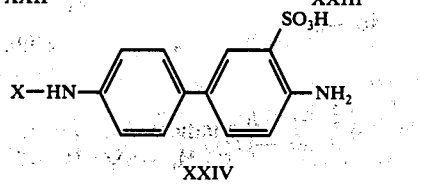

XXIV

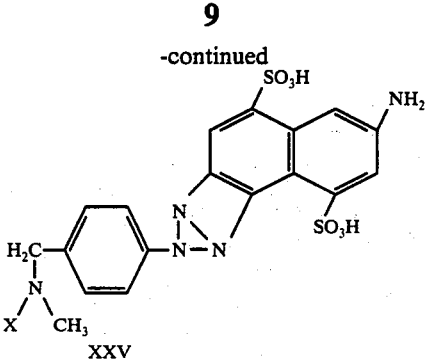

in which

X represents a reactive group.

Compounds of the following formulae should additionally be mentioned as amines D-NH$_2$:

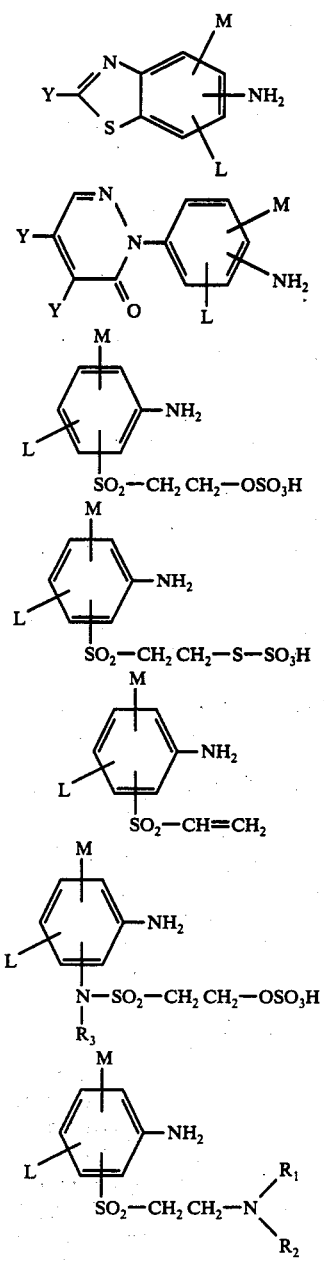

wherein

Y, M, L, R$_1$, R$_2$ and R$_3$ have the abovementioned meaning.

In detail, the following compounds may further be listed as examples of the amine D-NH$_2$: 2-chloro- or 2-fluoro-6-amino-benzthiazole, 2-methylsulphonyl-, 2-ethylsulphonyl-, 2-phenylsulphonyl-, 2-(4'-carboxyphenylsulphonyl)-6-amino-benzthiazole, 2-methylsulphonyl-6-methoxy-7-amino-, 2-methylsulphonyl-6-amino-7-sulpho-, 2-ethylsulphonyl-6-amino- and 2-ethylsulphonyl-6-amino-7-sulphobenzthiazole, 6-amino-2,3-dichloroquinoxaline, 3-amino-($\beta$-sulphatoethylsulphonyl)-benzene, 3-amino-4-methoxy-($\beta$-sulphatoethylsulphonyl)-benzene, 4-amino-5-methoxy-2-methyl-($\beta$-sulphatoethylsulphonyl)-benzene, 4-amino-($\beta$-sulphatoethylsulphonyl)-benzene, 3-amino-4-methoxy-($\beta$-diethylaminoethylsulphonyl)-benzene, 4-amino-($\beta$-diethylaminoethylsulphonyl)-benzene, N-methyl-N-($\beta$-sulphatoethylsulphonyl)-phenyldiamine-(1,4), 4,5-dichloro- or 4,5-dibromo-1-(4'-aminophenyl)-pyridazone-(6), 4,5-dichloro- or 4,5-dibromo-1-(4'-amino-2'-sulphophenyl)-pyridazone-(6), 4,5-dichloro- or 4,5-dibromo-1-(5'-amino-2'-sulphophenylamino)-pyridazone-(6).

If it is desired to obtain dyestuffs of the formula VIII, suitable amines Z-W-D$_2$-NH$_2$, wherein Z represents a —NH(R$_3$) group or a radical which can be converted into such a group, especially a nitro group, and W and D$_2$ have the abovementioned meaning, are coupled, and if required, the group Z is subsequently converted into the group —NH(R$_3$).

Examples of suitable amines are: 5-nitro-2-aminobenzenesulphonic acid, 2-amino-4-methylaminomethyl-benzene-sulphonic acid, 5-amino-2-methylaminomethyl-benzenesulphonic acid, 4-nitro-1-aminobenzene, 4-nitro-2-chloro-1-aminobenzene, 6-nitro-2-amino-naphthalene-4,8-disulphonic acid, 4-nitro-4'-aminostilbene-2,2'-disulphonic acid, 5-nitro-2-amino-1-carboxybenzene, 1-amino-4-nitro-naphthalene-6- or -7-sulphonic acid, 5-nitro-2-amino-1-methoxybenzene-4-sulphonic acid, p-[2-amino-4,8-disulphonaphtho-(5,6-4',5') triazolyl-(2')]-N-methylbenzylamine and 5-nitro-2-amino-1-methoxybenzene-3-sulphonic acid.

The reaction of the dyestuffs of the formula VIII with reactive components X-Y', wherein X has the indicated meaning and Y' represents a substituent which can be split off as an anion, takes place in a manner which is in itself known.

Reactive components X-Y' which are suitable for this purpose are, for example, those on which the abovementioned reactive groups are based, that is to say, in general, the halides, especially the chlorides, of the acyl components X which have been mentioned. Amongst the large number of the available compounds, the following may here be mentioned as a selection: trihalogen-sym.-triazines such as cyanuric chloride and cyanuric bromide, dihalogeno-monoamino- and -monosubst.-amino-sym.-triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o-, m- or p-sulphophenyl)-aminotriazine, 2,6-dichloro-4-(2',5'-, -2',4'- or -3',5'-disulphophenyl)-aminotriazine, dihalogeno-alkoxy- and -aryloxy-sym.-triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-hydroxytriazine, dihalogeno-alkylmercapto- and -arylmercapto-sym.-triazines, such as 2,6-dichloro-4-ethylmercapto-triazine, 2,6-dichloro-4-phenylmercapto-triazine, 2,6-dichloro-4-(p-methylphenyl)mercaptotriazine; tetrahalogenopyrimidines, such as tetrachloro-, tetrabromo- or tetrafluoro-pyrimidine, 2,4,6-trihalogeno-pyrimidines, such as 2,4,6-trichloro-, tribromo- or -trifluoro-pyrimidine, dihalogenopyrimidines, such as 2,4-dichloro-, -dibromo- or -difluoro-pyrimidine; 2,4,6-trichloro-5-nitro- or -5-methyl- or -5-carbomethoxy- or -5-carboethoxy- or -5-carboxymethyl- or -5-mono-, di- or trichloromethyl- or -5-carboxy- or -5-sulpho- or -5-cyano- or -5-vinylpyrimidine, 2,4-difluoro-6-methylpyrimidine, 2,6-difluoro-4-methyl-5-chloropyrimidine, 2,4-difluoro-pyrimidine-5-ethylsulphone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromo-pyrimidine, 4,6-difluoro-4,5-dichloro- or -dibromo-pyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoro-pyrimidine-5-carboxylic acid alkyl esters or 5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoro-pyrimidine, 6-phenyl-2,4-difluoropyrimidine, 6-trifluoromethyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethylpyrimidine, 2,4-difluoro-5-methylsulphonyl-pyrimidine, 2,4-difluoro-5-phenylpyrimidine, 2,4-difluoro-5-carbonamidopyrimidine, 2,4-difluoro-5-carbomethoxy-pyrimidine, 2,4-difluoro-6-trifluoromethyl-pyrimidine, 2,4-difluoro-5-bromo-6-trifluoromethyl-pyrimidine, 2,4-difluoro-6-carbonamidopyrimidine, 2,4-difluoro-6-carbonamido-pyrimidine, 2,4-difluoro-6-carbomethoxy-pyrimidine, 2,4-difluoro-6-phenyl-pyrimidine, 2,4-difluoro-6-cyano-pyrimidine, 2,4,6-trifluoro-5-methylsulphonyl-pyrimidine, 2,4-difluoro-5-sulphonamido-pyrimidine, 2,4-difluoro-5-chloro-6-carbomethoxy-pyrimidine, 5-trifluoromethyl-2,4-defluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride and 2,6-dichloropyrimidine-4-carboxylic acid chloride; pyrimidine reactive components with removable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-tris-methylsulphonylpyrimidine, 2,6-bis-methylsulphonyl-4,5-dichloropyrimidine, 2,4-bis-methylsulphonylpyrimidine-5-sulphonic acid chloride, 2-methyl-sulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonyl-pyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-trismethylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloropyrimidine-5-carboxylic acid, 2-methylsulphonyl-4-chloro-5-cyano-6-methoxypyrimidine, 2-methylsulphonyl-4,5-dichloropyrimidine, 4-methylsulphonyl-6-chloropyrimidine, 2-sulphoethylsulphonyl-4-chloro-6-methyl-pyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenylsulphonyl-4,5-dichloro-6-methylpyrimidine, 2-carboxymethylsulphonyl-4,5-dichloro-6-methylpyrimidine, 2-(2'- or 3'- or 4'-carboxy-phenylsulphonyl)-4,5-dichloro-6-methylpyrimidine, 2,4-bis-(2'- or 3'- or 4'-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromopyrimidine-5-carboxylic acid chloride or bromide, and 2,6-bis-(methylsulphonyl)-4-chloropyrimidine-5-carboxylic acid chloride; further reactive components of the heterocyclic series possessing reactive sulphonyl substituents are, for example, 3,6-bis-phenylsulphonylpyridazine, 3-methylsulphonyl-6-chloropyridazine, 3,6-bis-trichloro-methylsulphonyl-pyridazine, 3,6-bis-methylsulphonyl-4-methyl-pyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bismethylsulphonyl-6-trichloroethoxy-1,3,5-triazine, 2,4,6-tris-phenylsulphonyl-1,3,5-trizine, 2,4-bis-methylsulphonylquinazoline, 2,4-bis-trichloromethyl-sulphonylquinoline, 2,4-bis-carboxy-methylsulphonylquinoline, 2,6-bis-(methylsulphonyl)-pyridine-4-carboxylic acid chloride and 1-(4'-chlorocarbonylphenyl or 2'-chlorocarbonylethyl)-4,5-bis-methyl-sulphonylpyridazone-(6) and 2,4-bis-methylsulphonyl-6-phenoxy-1,3,3-triazine; further heterocyclic reactive components with mobile halogen are, inter alia, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride and the corresponding bromine compounds, 2,4-dichloroquinazoline-6- or -7-carboxylic acid chloride as well as the corresponding bromine compounds, 2- or 3- or 4-(4',5'-dichloropyridazon-6'-yl-1')-phenylsulphonic acid chloride or -carboxylic acid chloride as well as the corresponding bromine compounds, β-(4',5'-dichloropyridazon-6'-yl-1')ethyl carboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylaminotriazinyl-6)-carbamic acid chloride, N-methyl- or N-ethyl-N-(2,4-dichlorotriazinyl-6)-amino-acetyl chloride, N-methyl-, N-ethyl- or N-hydroxyethyl-N-(2,3-dichloroquinoxaline-6-sulphonyl- or -6-carbonyl)-aminoacetyl chloride and the corresponding bromine derivatives, and also 2-chlorobenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonyl-benzthiazole-5- or -6-sulphonic acid chloride or -5- or -6-carboxylic acid chloride as well as the corresponding 2-sulphonylbenzthiazole derivatives which contain sulphonic acid groups in the fused benzene ring, 3,5-bis-methylsulphonyl-isothiazole-4-carboxylic acid chloride, 2-chlorobenzoxazole-5- or -6-carboxylic acid chloride or -sulphonic acid chloride and the corresponding bromine derivatives, 2-chlorobenzimidazole-5- or -6-carboxylic acid chloride or -sulphonic acid chloride as well as the corresponding bromine derivatives, 2-chloro-1-methyl-benzimidazole-5- or -6-carboxylic acid chloride or -sulphonic acid chloride as well as the corresponding bromine derivatives, 2-chloro-4-methyl-thiazole-(1,3)-5-carboxylic acid chloride or -4- or -5-sulphonic acid chloride, 2-chlorothiazole-4- or -5-sulphonic acid chloride and the corresponding bromine derivatives.

The following should be mentioned as examples from the series of the aliphatic reactive components: acrylic acid chloride, mono-, di- or tri-chloroacrylic acid chloride, 3-chloropropionic acid chloride, 3-phenylsulphonyl-propionic acid chloride, 3-methylsulphonyl-propionic acid chloride, 3-ethylsulphonyl-propionic acid chloride, 2-chloroethanesulphonyl chloride, chloromethanesulphonyl chloride, 2-chloroacetyl chloride, 2,2,3,3-tetrafluorocyclotubane-1-carboxylic acid chloride, β-(2,2,3,3-tetrafluorocyclobutyl-1-)-acrylic acid chloride, β-(2,3,3-trifluoro-2-chloro-cyclobutane-1-)-carboxylic acid chloride, β-methyl-sulphonylacrylic acid chloride, a-methylsulphonyl-acrylic acid chloride and a-bromoacrylic acid chloride and β-bromoacrylic acid chloride.

If the conversion leads to dyestuffs which possess more than one reactive group in the radical X or in another position of the dyestuff molecule, then these can be partly replaced by other radicals, for example amino radicals, which can in turn possess reactive groups, for example in the form of esterified hydroxyalkyl groups.

In principle, it is possible for two or more reactive groups which are different from one another to be present in the dyestuff.

The new dyestuffs are suitable for dyeing and printing materials containing hydroxyl groups or amide groups, such as textile fibres, filaments and fabrics of wool, silk and synthetic polyamide and polyurethane fibres, and for the wash-fast dyeing and printing of natural or regenerated cellulose, the treatment of cellulose materials being appropriately carried out in the presence of acid-binding agents and if appropriate by the action of heat, in accordance with the processes which have been disclosed for reactive dyestuffs.

In the examples which follow, parts represent parts by weight. The temperatures are given in degrees centigrade.

EXAMPLE 1

22 parts of 2-amino-5-nitrobenzene-1-sulphonic acid are diazotised indirectly. The suspension of the diazo compound is run into a solution of 35 parts of 4-amino-3,5-disulphoacetoacetic acid anilide and 28 parts of bicarbonate in 150 parts of water. The coupling takes place rapidly.

25 parts of $Na_2S \cdot 3H_2O$ are dissolved in 300 parts of water and adjusted to pH 10 by adding concentrated hydrochloric acid, the addition being made below the surface of the liquid. The mixture is then warmed to 50°–60° C. and the nitro compound obtained according to paragraph 1 is added. After completion of the reduction, the sulphur which has separated out is filtered off and the dyestuff is salted-out from the filtrate by adding 20% by volume of sodium chloride and is filtered off.

The paste is dissolved in 800 parts of water and after warming to 45°, 28 parts of 2,3-dichloroquinoxaline-6-carboxylic acid chloride are added. The pH-value is kept at between 6 and 7 by dropwise addition of 10% strength sodium carbonate solution. The condensation is complete after stirring for several hours. The mixture is clarified and the dyestuff is separated out from the filtrate by means of 10% strength of volume sodium chloride. After filtering off, drying and grinding, a yellow dyestuff powder is obtained which easily dissolves in water to give a yellow colour. In the form of the free acid, the dyestuff corresponds to the formula

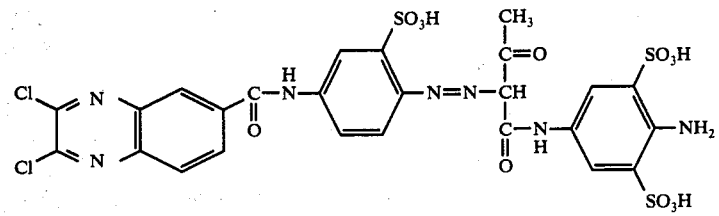

If one of the dyeing examples given later is followed, the dyestuff gives a clear, greenish-tinged yellow of good fastness to light and washing on cellulose-containing materials.

To manufacture the coupling component, 4-amino-3,5-disulpho-acetoacetic acid anilide, the following procedure is adopted: 540 parts of 1,4-diaminobenzene-2,6-disulphonic acid are neutralised by means of 120 parts by volume of concentrated sodium hydroxide solution ($d = 1.5$) in 2,000 parts of water. 176 parts by volume of diketene are then added dropwise, whilst ensuring, through cooling, that the temperature does not rise above 40° C. 2,700 parts by volume of a clear solution which can be used directly for the coupling reaction are obtained. The compound can be separated out by adding 25% by volume of sodium chloride.

DYEING EXAMPLES

Printing Instruction

If a heavy cotton fabric is printed with a printing paste which per kilogram contains 20 g of the dyestuff, 100 g of urea, 300 ml of water, 500 g of alginate thickener (60 g of sodium alginate/kg of thickener) and 10 g of sodium carbonate and which has been made up to 1 kg with water, and the fabric is dried, steamed for 1 minute at 103° C., rinsed with hot water and soaped at the boil, a clear, greenish-tinged yellow print of good wet fastness and light fastness is obtained.

Padding Instruction 30 parts of the dyestuff manufactured according to Example 1 are dissolved in 1,000 parts of water. A cotton fabric is padded with this solution and squeezed out to a weight decrease of 90%. The cotton, which is still moist, is treated for 30 minutes at 70° in a bath which contains 300 parts of calcined sodium sulphate and 10 parts of calcined sodium carbonate per 1,000 parts of water. Thereafter the dyeing is finished in the usual manner. A clear, greenish-tinged yellow dyeing with excellent wet fastness and light fastness properties is obtained.

Dyeing Instruction 168 ml of water at 20°–25° are first introduced into a dyeing beaker of 300 ml capacity, located in a water-bath which can be heated. 0.3 g of the dyestuff obtained according to Example 1 is thoroughly worked into a paste with 2 ml of cold water and 30 ml of hot water (70°) is added; hereupon the dyestuff dissolves. The dyestuff solution is added to the initially introduced water and 10 g of cotton yarn are constantly agitated in this dyeing liquor. The temperature of the dyeing liquor is raised to 70°–80° over the course of 10 minutes, 10 g of anhydrous sodium sulphate are added and dyeing is continued for 30 minutes. 4 g of anhydrous sodium carbonate are then added to the dyeing liquor and dyeing is carried out for 60 minutes at 70°–80°. The dyed material is then withdrawn from the dyeing liquor, the adhering liquor is removed by wringing out or squeezing out, and the material is rinsed, firstly with cold water and then with hot water, until the rinsing liquor shows no more bleeding of dyestuff. Thereafter the dyed material is soaped for 20 minutes at the boil in 200 ml of a liquor which contains 0.2 g of sodium alkyl-sulphate, again rinsed and dried in a drying cabinet at 60°–70°. A greenish-tinged yellow dyeing of excellent wash fastness and light fastness properties is obtained.

If the procedure indicated in Example 1 is followed, but using the diazo components and reactive components listed in the table which follows, valuable reactive dyestuffs are again obtained. The differing reactivity of the reactive components during acylation is taken into account by an appropriate choice of the temperature, as is known from the literature.

| Example | Diazo Component | Reactive Component | Colour Shade |
|---|---|---|---|
| 2 | 1-Amino-4-nitrobenzene-2-sulphonic acid | 2,4,6-Trifluoro-5-chloro-pyrimidine | greenish-tinged yellow |
| 3 | " | Tetrachloro-pyrimidine | " |
| 4 | " | 1,4-Dichlorophthalazine-6-carboxylic acid chloride | " |
| 5 | " | 2-Methylsulphonyl-benzthiazole-5- or -6-carboxylic acid chloride | " |
| 6 | " | β-(2,2,3,3-Tetrafluorocyclobutyl-1-)-acrylic acid chloride | " |
| 7 | " | α-Bromoacrylic acid chloride | " |
| 8 | " | 2,5-Bis-methylsulphonyl-isothiazole-4-carboxylic acid chloride | " |
| 9 | " | Cyanuric chloride | " |
| 10 | " | 2-Amino-4,6-dichloro-triazine | " |
| 11 | " | 2-Amino-phenyl-4,6-dichlorotriazine | " |
| 12 | " | 2-Methylsulphonyl-4,5-dichloro-6-methyl-pyrimidine | " |
| 13 | " | 2,4,6-Trichloro-pyrimidine-5-carboxylic acid chloride | " |
| 14 | " | 3-(4',5'-Dichloropyridazon-6'-yl-1')-propionyl chloride | " |
| 15 | 1-Amino-2-carboxy-4-nitrobenzene | 2,3-Dichloroquinoxaline-6-carboxylic acid chloride | " |
| 16 | " | 2,4,6-Trifluoro-5-chloro-pyrimidine | " |
| 17 | " | 2-Methylsulphonyl-4,5-dichloro-6-methyl-pyrimidine | " |
| 18 | 4-Nitro-4'-aminostilbene-2,2'-disulphonic acid | 2,3-Dichloroquinoxaline-6-carboxylic acid chloride | yellow |
| 19 | " | Tetrachloropyrimidine | " |
| 20 | " | 2,4,6-Trifluoro-5-chloro-pyrimidine | " |
| 21 | 1-Amino-4-nitro-naphthalene-6- or -7-sulphonic acid | 2,3-Dichloroquinoxaline-6-carboxylic acid chloride | " |
| 22 | " | 2,4,6-Trifluoro-5-chloro-pyrimidine | " |
| 23 | " | Cyanuric chloride | " |
| 24 | " | Tetrachloropyrimidine | " |
| 25 | 2-Amino-6-nitro-naphthalene-4,8-disulphonic acid | 2,4,6-Trifluoro-5-chloropyrimidine | " |
| 26 | " | Cyanuric chloride | " |
| 27 | 1-Amino-2-methoxy-4-nitrobenzene-5-sulphonic acid | " | greenish-tinged yellow |
| 28 | 1-Amino-2-methoxy-4-nitrobenzene-5-sulphonic acid | 2,3-Dichloroquinoxaline-6-carboxylic acid chloride | " |
| 29 | 1-Amino-4-nitrobenzene | Cyanuric chloride | " |
| 30 | " | 2-(4'-Sulphophenylamino)-4,6-dichlorotriazine | " |
| 31 | 4'-Nitro-2'-sulpho-4-amino-diphenylamine | Cyanuric chloride | yellow |

EXAMPLE 32

A solution, neutralised with sodium carbonate, 26.8 parts of 1,4-diaminobenzene-2,5-disulphonic acid is added to an aqueous suspension of 18.3 parts of cyanuric chloride and the mixture is stirred at a temperature of 0°–5° whilst keeping the pH-value slightly acid by dropwise addition of a dilute sodium hydroxide solution. After completion of the condensation, the mixture is acidified with 30 parts of 30% strength hydrochloric acid and diazotised with 24.5 parts by volume of a 30% strength sodium nitrite solution. The resulting yellow diazotised mixture is added to an ice-cold solution of 35 parts of 4-amino-3,5-disulpho-acetoacetic acid anilide containing 28 parts of sodium bicarbonate. After completion of coupling, the excess sodium bicarbonate is destroyed with hydrochloric acid and the dyestuff is isolated by salting-out and filtration. The dyestuff paste is mixed with a mixture of 5 parts of disodium phosphate and 5 parts of monosodium phosphate and is dried in vacuo at a low temperature. The dyestuff, which corresponds to the following formula

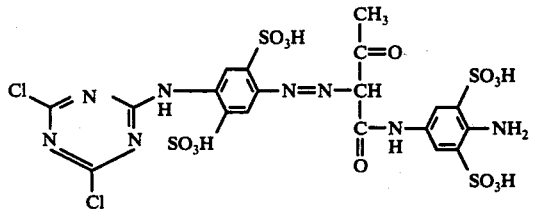

gives clear, greenish-tinged yellow dyeings of good light fastness and wet fastness when used in one of the dyeing processes mentioned.

If, in Example 32, the 4-amino-3,5-disulphoacetoacetic acid arylide is replaced by the corresponding amount of 4-amino-2,5-disulpho-acetoacetic acid arylide, a valuable reactive dyestuff, which dyes cotton in greenish-tinged yellow shades, is again obtained.

EXAMPLE 33

50 parts of 10% strength ammonia are added to the solution of the dichlorotriazine dyestuff obtained according to the data of Example 32 and the solution is kept for 2 hours at 35°. The monochlorotriazine dyestuff formed is then salted-out, isolated and dried. A dyestuff which dyes cotton in clear, greenish-tinged yellow shades is obtained. If ammonia is replaced by an equivalent amount of ethylamine, ethanol or diethanolamine, dyestuffs with similar properties are obtained.

EXAMPLE 34

24.5 parts of 1-amino-2-methoxy-4-(β-sulphatoethylsulphonyl)-5-methylbenzene are diazotised indirectly and are coupled, in a medium rendered alkaline with bicarbonate, to a solution of 35 parts of 4-amino-3,5-disulpho-acetoacetic acid anilide in 150 parts of water. The dyestuff is isolated by salting-out and filtration. It corresponds to the formula

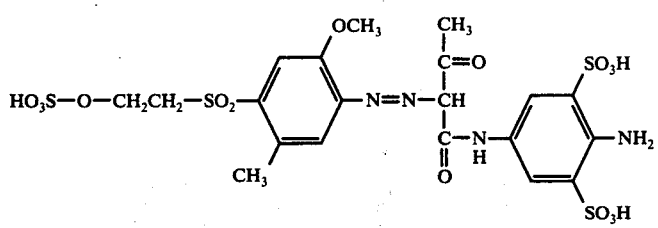

The dyestuff gives strong greenish-tinged yellow dyeings on cotton.

EXAMPLE 35

46.3 parts of p-[2-amino-4,8-disulpho-naphtho-(5,6,4′,5′)-triazolyl-(2′)-N-methylbenzylamine are diazotised indirectly. The suspension of the diazo compound is run into a solution of 35 parts of 4-amino-3,5-disulphoacetoacetic acid anilide and 28 parts of sodium bicarbonate in 150 parts of water. After completion of coupling, the mixture is warmed to 40° and 28 parts of 2,3-dichloroquinoxaline-6-carboxylic acid chloride are sprinkled in. The pH-value is kept at between 7 and 8 by dropwise addition of 10% strength sodium carbonate solution. After clarifying and salting-out, the acylated dyestuff is separated off and isolated. It corresponds to the following formula:

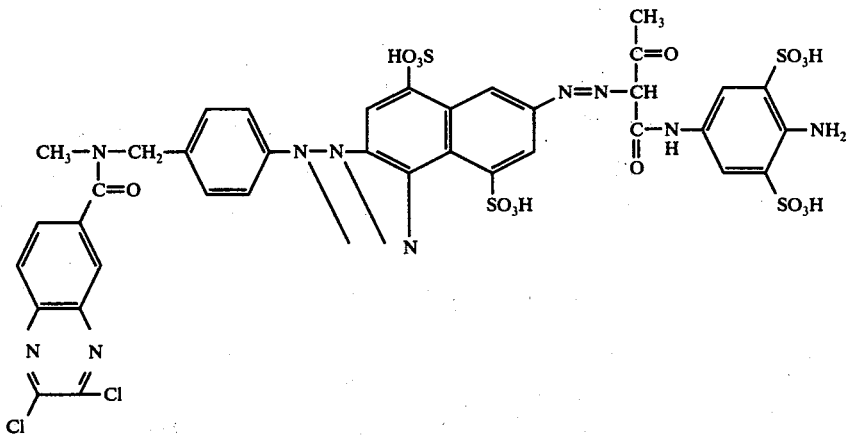

and gives a clear yellow when used to dye cotton in accordance with one of the processes mentioned. If the instructions of this example are followed, but using the diazo components and reactive components listed below, valuable reactive dyestuffs are again obtained.

| Example | Diazo Components | Reactive Components | Colour Shade |
|---|---|---|---|
| 36 | 3-Amino-4-methoxy-benzylmethylamine | 2,4,6-Trifluoro-5-chloro-pyrimidine | greenish-tinged yellow |
| 37 | " | Tetrachloropyrimidine | " |
| 38 | " | 2-Bromoacrylic acid chloride | " |
| 39 | 4-Amino-benzylmethylamine | 2,4,6-Trifluoro-5-chloropyrimidine | " |

EXAMPLE 40

26 parts of finely powdered 2-methylsulphonyl-6-methoxy-7-aminobenzthiazole in 28 parts of concentrated hydrochloric acid are stirred in a mixture of 250 parts of water and 250 parts of ice. 24.5 parts by volume of 30% strength sodium nitrite solution are run in. The mixture is stirred for a further hour and the diazotised mixture is clarified. The yellow solution is run into 35 parts of 4-amino-3,5-disulpho-acetoacetic acid anilide and 28 parts of sodium bicarbonate in 150 parts of water. After completion of coupling, the dyestuff is isolated by salting-out. It corresponds to the following formula:

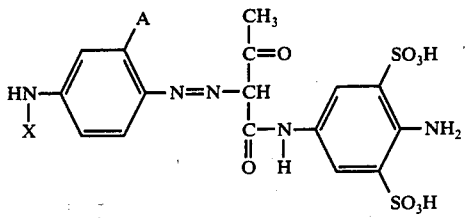

and gives a clear yellow of good light fastness and wet fastness when printed on cotton.

EXAMPLE 41

7.2 g of sodium nitrite are dissolved in a neutral solution of 33.7 g of 4-(2',6'-difluoro-5'-chloropyrimidinyl-(4')-amino)-aniline-2-sulphonic acid (calculated as free acid) in 200 ml of water, and the solution is introduced into a mixture of 30 ml of concentrated hydrochloric acid ($d = 1.18$) and 200 g of ice. The mixture is stirred for a further hour at 0° C. before excess nitrite is destroyed with amidosulphonic acid. Thereafter, a neutral solution of 35.2 g of 4-acetoacetylamino-aniline-2,6-disulphonic acid (calculated as free acid) in 150 ml of water and a further 100 g of ice are added and approx. 110 ml of 10% strength sodium hydroxide solution are introduced dropwise at 0° C. over the course of 1 hour until a pH-value of 7 is reached. The coupling is then complete.

The mixture is warmed to room temperature, the precipitation of the dyestuff is completed by introducing 100 g of sodium chloride, and after 1 hour the product is filtered off. The dyestuff of the formula

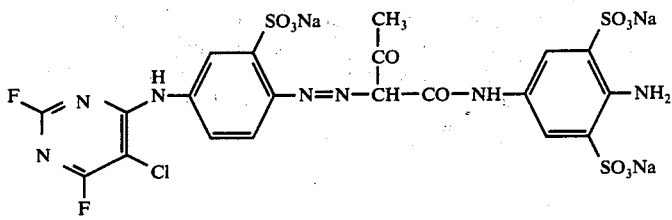

after drying in vacuo at 50° C. is a yellow powder and is identical with the product described in Example 2.

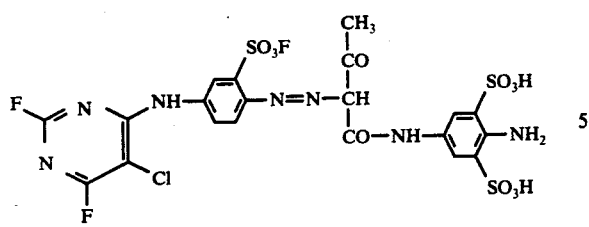

We claim:

1. Reactive dyestuff of the formula

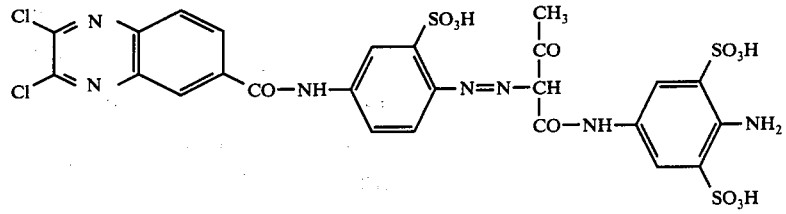

in which
A is hydrogen, carboxy or sulfo; and
X is a fiber reactive group containing at least one removable substituent bonded to the carbon atom of a —C═N— group in a pyrimidine, sym. triazine or quinoxaline ring and which is capable of forming a covalent bond with amino, amide or hydroxyl groups of natural or synthetic fiber materials under dyeing or printing conditions.

2. The reactive dyestuff of claim 1 having the formula

3. The reactive dyestuff of claim 1 having the formula